(12) United States Patent
Sakoda et al.

(10) Patent No.: US 11,273,741 B2
(45) Date of Patent: Mar. 15, 2022

(54) VEHICLE SEAT

(71) Applicant: TS TECH CO., LTD., Asaka (JP)

(72) Inventors: Keisuke Sakoda, Tochigi (JP); Kohei Taguchi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 16/904,882

(22) Filed: Jun. 18, 2020

(65) Prior Publication Data

US 2020/0317099 A1 Oct. 8, 2020

Related U.S. Application Data

(63) Continuation of application No. 16/089,140, filed as application No. PCT/JP2017/012406 on Mar. 27, 2017, now Pat. No. 10,723,248.

(30) Foreign Application Priority Data

Mar. 28, 2016 (JP) .................................. 2016-063852

(51) Int. Cl.
*B60N 2/56* (2006.01)
*B60N 2/58* (2006.01)
(Continued)

(52) U.S. Cl.
CPC ............ *B60N 2/5825* (2013.01); *A47C 7/744* (2013.01); *A47C 31/02* (2013.01); *B60N 2/56* (2013.01);
(Continued)

(58) Field of Classification Search
CPC .......... B60N 2/5825; B60N 2/90; B60N 2/56; B60N 2/5621; B60N 2/5635;
(Continued)

(56) References Cited

U.S. PATENT DOCUMENTS

| 2003/0001421 A1 | 1/2003 | Schmidt |
| 2009/0295200 A1 | 12/2009 | Ito et al. |

(Continued)

FOREIGN PATENT DOCUMENTS

| JP | S58-039152 U | 3/1983 |
| JP | S62-70899 U | 5/1987 |

(Continued)

OTHER PUBLICATIONS

Chinese Office Action dated Jul. 2, 2021 from the China National Intellectual Property Administration (CNIPA) for the corresponding Chinese Patent Application No. 201780010534.4, with English machine translation.

*Primary Examiner* — Mark R Wendell (74) *Attorney, Agent, or Firm* — Michael Best & Friedrich LLP (57) ABSTRACT

A mechanism for suspending a skin material on a seat rear surface with a simple and light structure is described. A vehicle seat including a seat back forming a backrest surface includes a seat back pad which is a cushion material of the seat back, a skin material which covers the seat back pad, a wire of which a part is embedded inside the seat back pad and another part is exposed to a seat rear surface, and a hook which is attached to an end portion of the skin material on the side of the seat rear surface. The wire engages with the hook so that the skin material is suspended and fixed to the seat rear surface of the seat back.

17 Claims, 9 Drawing Sheets

(51) Int. Cl.
*B60N 2/90* (2018.01)
*B60N 2/70* (2006.01)
*A47C 31/02* (2006.01)
*A47C 7/74* (2006.01)
*B60N 2/809* (2018.01)

(52) U.S. Cl.
CPC ......... *B60N 2/5621* (2013.01); *B60N 2/5635* (2013.01); *B60N 2/5657* (2013.01); *B60N 2/58* (2013.01); *B60N 2/7094* (2013.01); *B60N 2/90* (2018.02); *B60N 2/809* (2018.02)

(58) Field of Classification Search
CPC ...... B60N 2/5657; B60N 2/58; B60N 2/7094; B60N 2/809; A47C 7/744; A47C 31/02
USPC ...................................................... 297/218.1
See application file for complete search history.

(56) References Cited

U.S. PATENT DOCUMENTS

| | | |
|---|---|---|
| 2011/0080032 A1 | 4/2011 | Hofmann |
| 2012/0001462 A1* | 1/2012 | Cyoukyu ........... B60N 2/42709 297/216.13 |
| 2014/0042785 A1 | 2/2014 | Sato et al. |
| 2015/0239379 A1 | 8/2015 | Yoshida et al. |

FOREIGN PATENT DOCUMENTS

| | | |
|---|---|---|
| JP | H07-185154 A | 7/1995 |
| JP | 2001-070083 A | 3/2001 |
| JP | 2008-073441 A | 4/2008 |
| JP | 2009-291310 A | 12/2009 |
| JP | 2012-050547 A | 3/2012 |
| JP | 2013-059413 A | 4/2013 |

\* cited by examiner

CROSS-SECTION OF VIII-VIII

FIG. 9

VEHICLE SEAT

CROSS REFERENCE TO RELATED APPLICATIONS

This application is a continuation of U.S. patent application Ser. No. 16/089,140, filed Sep. 27, 2018, which is a National Stage Entry application of PCT Application No. PCT/JP2017/012406, filed Mar. 27, 2017, which claims the priority benefit of Japanese Patent Application No. JP 2016-063852, filed Mar. 28, 2016, the contents being incorporated herein by reference.

BACKGROUND

The present disclosure relates to a vehicle seat which includes a mechanism for suspending a skin on a seat rear surface.

There is known a mechanism which draws a skin material of a vehicle seat into a groove provided in a front surface of a seat so that the skin material is suspended therein. Further, Japanese Patent Publication JP 2013-59413 A below discloses a mechanism which suspends a skin material on a seat rear surface by fitting an annular wire to a locking wire attached to a seat frame.

However, in the related art, since there is a need to attach a wire or bracket for a suspending operation to the seat frame by welding, the weight of the seat increases and the attachment operation requires an effort. For that reason, there has been a demand for realizing a mechanism for suspending a skin material on a rear surface of a vehicle seat with a simple and light structure.

SUMMARY

The present disclosure has been made in view of the above-described circumstances and an embodiment of the present disclosure is to provide a vehicle seat capable of realizing a mechanism for suspending a skin material on a seat rear surface with a simple and light structure.

The above-described problem is solved by a vehicle seat including a seat back forming a backrest surface, including: a seat back pad which is a cushion material of the seat back; a skin material which covers the seat back pad; a first engagement portion of which a part is embedded inside the seat back pad and the other part is exposed to a seat rear surface; and a second engagement portion which is attached to an end portion of the skin material on the side of the seat rear surface, wherein the first engagement portion engages with the second engagement portion so that the skin material is suspended and fixed to the seat rear surface of the seat back.

According to the above-described vehicle seat, it is possible to suspend the skin material without wrinkles even at a position in which the unevenness of the seat rear surface is large and steps are likely to be formed. Accordingly, it is possible to obtain a satisfactory appearance design of the vehicle seat. Further, according to the above-described vehicle seat, since there is no need to attach a member such as a bracket or a wire to the seat frame in order to suspend the skin material on the seat rear surface, it is possible to decrease the weight of the seat. Further, it is also possible to reduce the operation load for suspending the skin material of the seat. Furthermore, according to the above-described vehicle seat, since the skin material suspending mechanism is provided at the seat back pad instead of the seat frame, an operation in which the occupant sinks into the seat in the event of a rear end collision is not hindered. Accordingly, it is possible to improve the shock absorbing performance for the neck portion of the occupant.

Further, in the above-described vehicle seat, the first engagement portion may be a wire including a embedded portion which is embedded inside the seat back pad and an exposure portion which extends from the embedded portion and is exposed from the seat back pad, the second engagement portion may include a hook-shaped portion, and the hook-shaped portion may engage with the exposure portion. With such a configuration, it is possible to improve the workability at the time of suspending the skin material on the seat rear surface.

Further, in the above-described vehicle seat, the skin material may be suspended and fixed to the seat rear surface of the seat back at a position of a lower end portion of the seat back pad on the side of the seat rear surface. With such a configuration, it is possible to suspend the skin material in accordance with the shape of the seat back pad. Accordingly, the appearance design of the seat rear surface becomes satisfactory.

Further, in the above-described vehicle seat, the first engagement portion may be provided at a center portion of the seat back, and the skin material may be suspended and fixed to the seat rear surface of the seat back at one point of the center portion. With such a configuration, it is possible to further reduce the working load during the suspending operation. Further, in the above-described vehicle seat, since the number of suspending positions is set to be minimal, it is possible to suppress the interference between the suspending position and the other members inside the vehicle seat. That is, it is possible to improve the degree of freedom in arrangement inside the vehicle seat.

Further, in the above-described vehicle seat, the first engagement portion may be disposed at a position different from a position in which a duct hole of a ventilation unit is provided. With such a configuration, the ventilation unit and the skin material suspending mechanism can be disposed inside the vehicle seat without interfering with each other. Accordingly, it is possible to decrease the size of the vehicle seat even when the ventilation unit is provided. Further, according to the above-described vehicle seat, it is possible to improve the workability involving with the attachment of the ventilation unit and the suspension of the skin material.

Further, in the above-described vehicle seat, an air blowing portion of the ventilation unit may be disposed at a position above the engagement position between the first engagement portion and the second engagement portion and a position between front and rear surfaces of the seat back pad. With such a configuration, since it is possible to cover the vicinity of the air blowing portion inside the vehicle seat by the seat back pad and to further narrow the skin material suspending inner space, it is possible to suppress the leakage of the air blowing sound to the outside.

Further, in the above-described vehicle seat, the seat back pad may include a seat upper portion and a seat lower portion respectively having different hardness, and the seat upper portion may be formed to have hardness and density lower than those of the seat lower portion. With such a configuration, it is possible to stably support the upper body of the seated person by the seat back. That is, it is possible to improve the seating feeling in the vehicle seat.

Further, the above-described vehicle seat may further include a third engagement portion which is embedded in the seat back pad and is provided in the vicinity of a groove formed on a seat front surface of the seat back; and a fourth engagement portion which is attached to an end portion of the skin material on the side of the seat front surface, wherein an end portion of the skin material on the side of the seat front surface is drawn into the groove, the third engagement portion engages with the fourth engagement portion, and the skin material is suspended and fixed to the seat front surface of the seat back. With such a configuration, it is possible to suppress the forward/backward movement of the seat back pad by eliminating a gap between the seat back pad and the seat back frame. Further, according to the above-described vehicle seat, since it is possible to suspend and fix the skin material of the seat back to both front and rear surfaces of the seat, the appearance design of the vehicle seat becomes further satisfactory.

Further, in the above-described vehicle seat, the air blowing portion may be located above the first engagement portion. With such a configuration, since the air blowing portion is disposed above a position in which the skin material is suspended and fixed to the seat rear surface of the seat back, a space surrounding the air blowing portion becomes compact and thus the leakage of the sound generated by the air blowing portion to the outside can be suppressed.

Further, in the above-described vehicle seat, at least a part of a duct of the ventilation unit may be located above the first engagement portion. With such a configuration, since the movement of the duct of the ventilation unit is regulated, it is possible to suppress the generation of noise from the duct connection portion.

According to the present disclosure, it is possible to realize the mechanism for suspending the skin material on the seat rear surface with a simple and light structure.

According to an embodiment of the present disclosure, it is possible to improve the workability at the time of suspending the skin material on the seat rear surface.

According to an embodiment of the present disclosure, it is possible to suspend the skin material in accordance with the shape of the seat back pad.

According to an embodiment of the present disclosure, it is possible to further reduce the working load during the suspending operation. Further, it is possible to improve the degree of freedom in arrangement inside the vehicle seat.

According to an embodiment of the present disclosure, it is possible to dispose the ventilation unit and the skin material suspending mechanism inside the vehicle seat without interfering with each other.

According to an embodiment of the present disclosure, it is possible to suppress the leakage of the air blowing sound of the ventilation unit to the outside of the vehicle seat.

According to an embodiment of the present disclosure, it is possible to stably support the upper body of the seated person by the seat back.

According to an embodiment of the present disclosure, it is possible to suppress the forward/backward movement of the seat back pad. Further, the appearance design of the vehicle seat becomes further satisfactory.

According to an embodiment of the present disclosure, it is possible to suppress the leakage of the sound generated by the air blowing portion to the outside of the seat.

According to an embodiment of the present disclosure, it is possible to suppress the generation of noise from the duct connection portion.

BRIEF DESCRIPTION OF DRAWINGS

Various embodiments of the invention are illustrated in the drawings, in which.

DETAILED DESCRIPTION

Hereinafter, a vehicle seat S according to an embodiment (hereinafter, the present embodiment) of the present disclosure is described with reference to FIGS. 1 to 9. An outline of each drawing is as described below.

Figure 1:
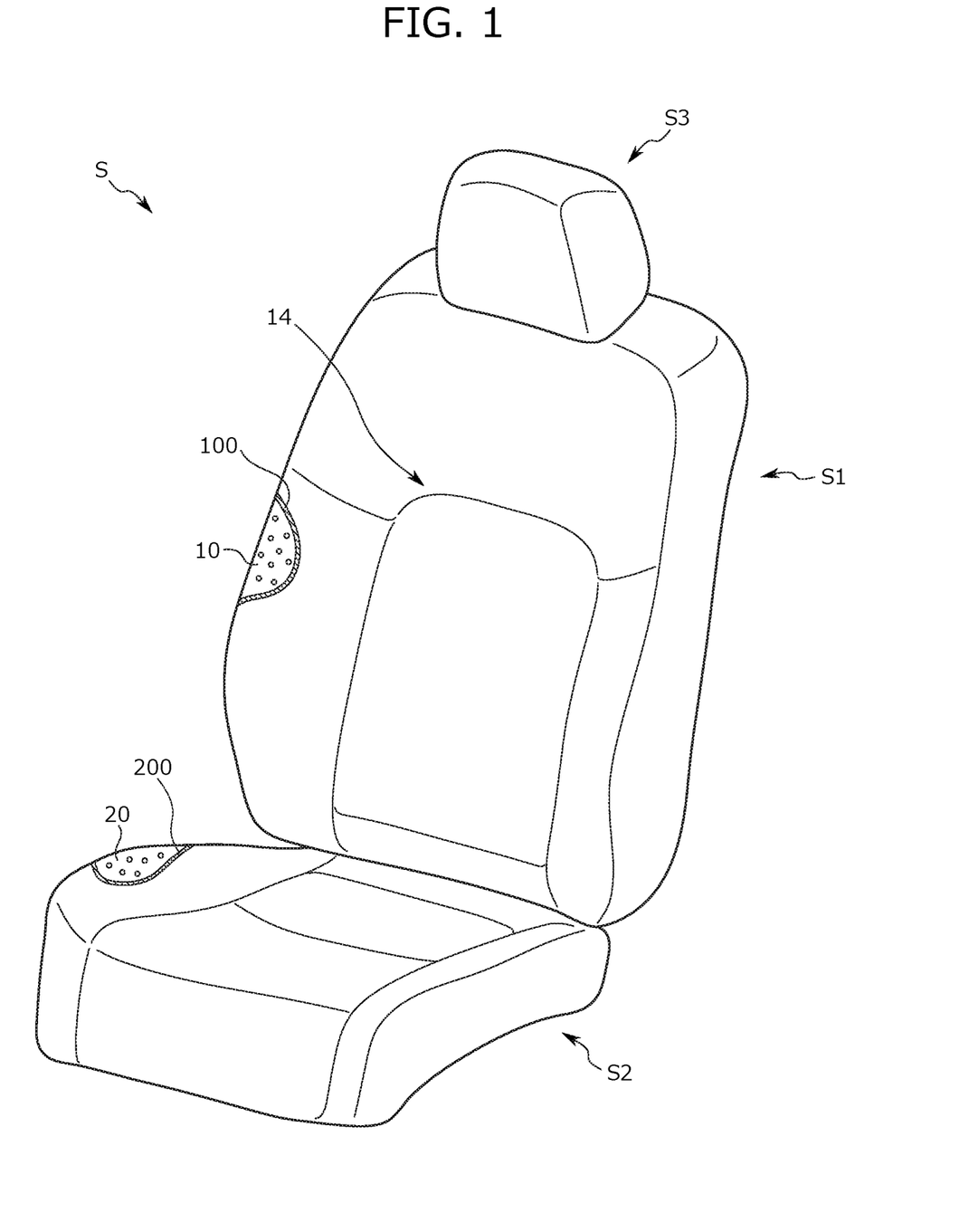
FIG. 1 is a perspective view of a vehicle seat according to the present embodiment.
Figure 2:
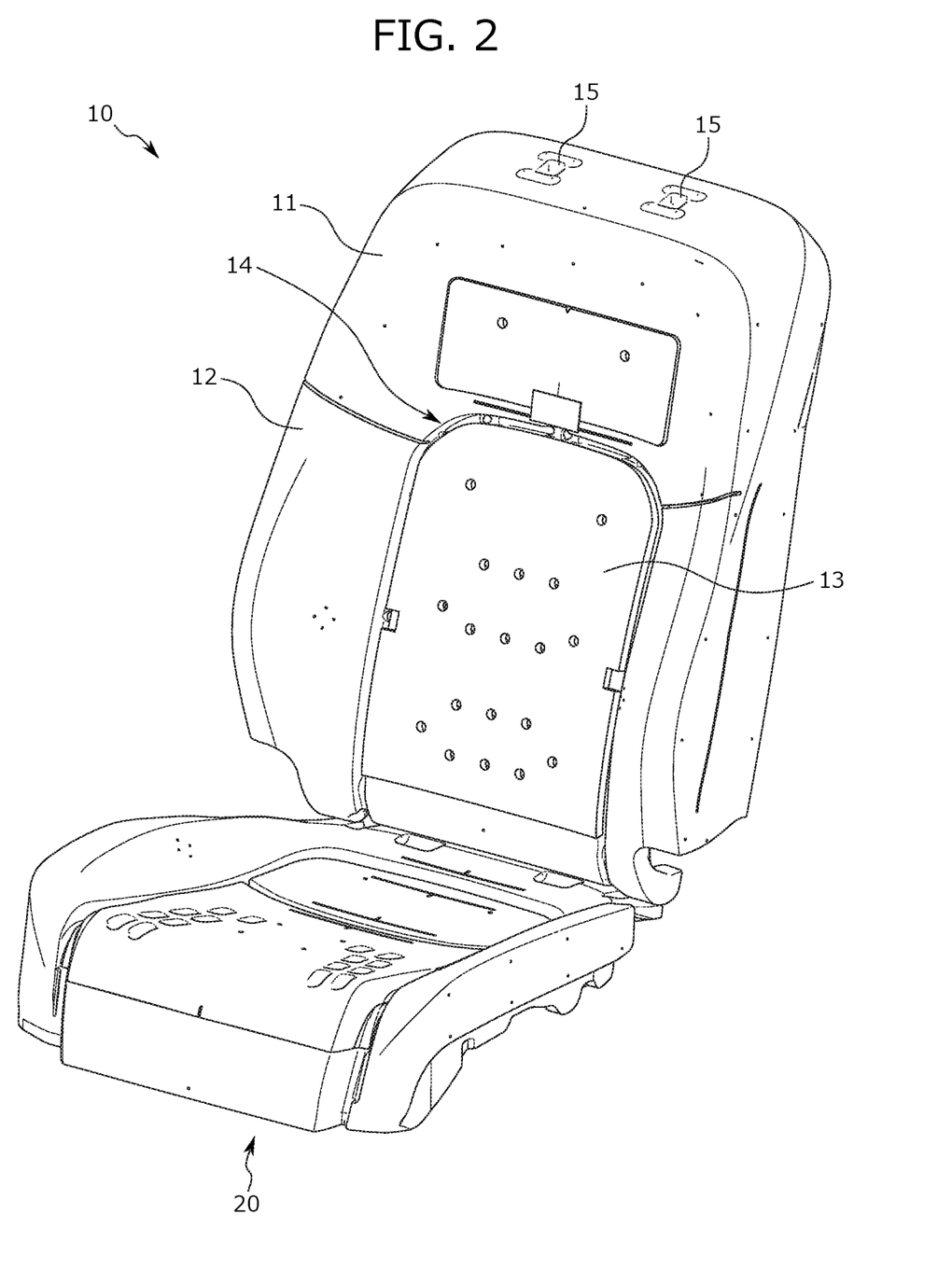
FIG. 2 is a perspective view of a seat back pad and a seat cushion pad.

FIG. 1 is a perspective view of the vehicle seat S according to the present embodiment. Further, FIG. 2 is a perspective view of a seat back pad 10 and a seat cushion pad 20 provided in the vehicle seat S.

Figure 3:
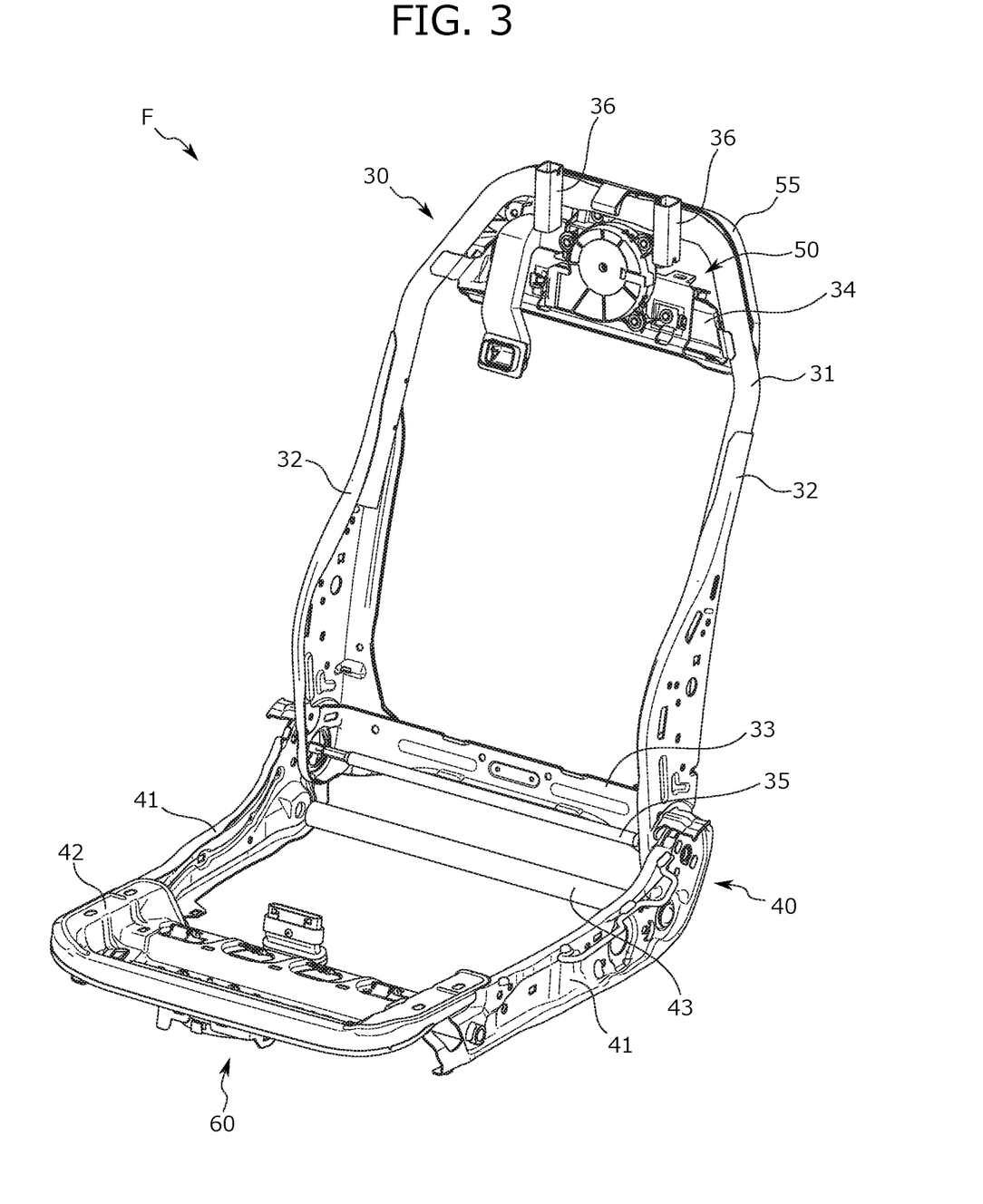
FIG. 3 is a perspective view of a seat frame.
Figure 4:
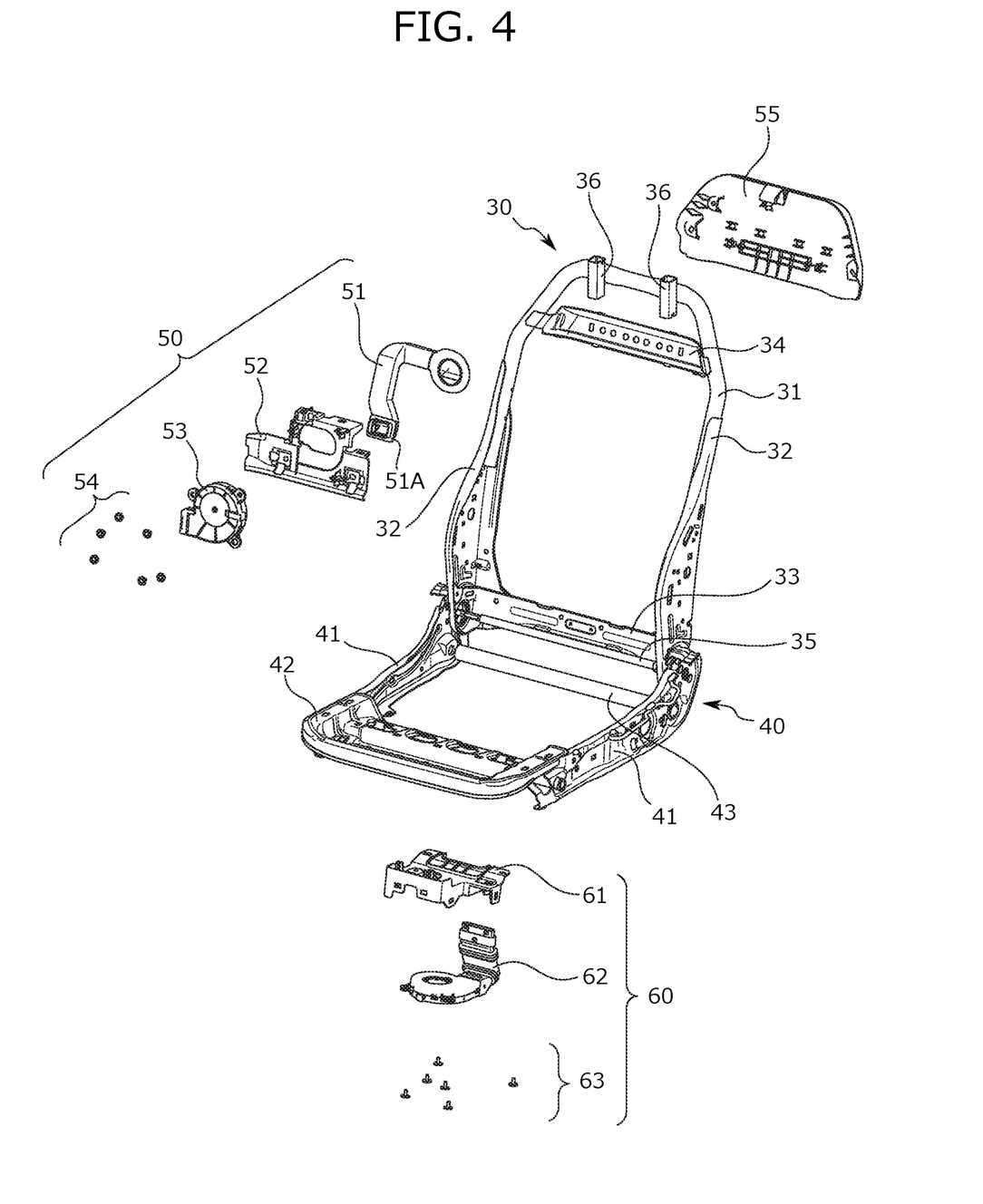
FIG. 4 is an exploded perspective view of the seat frame.
Figure 5:
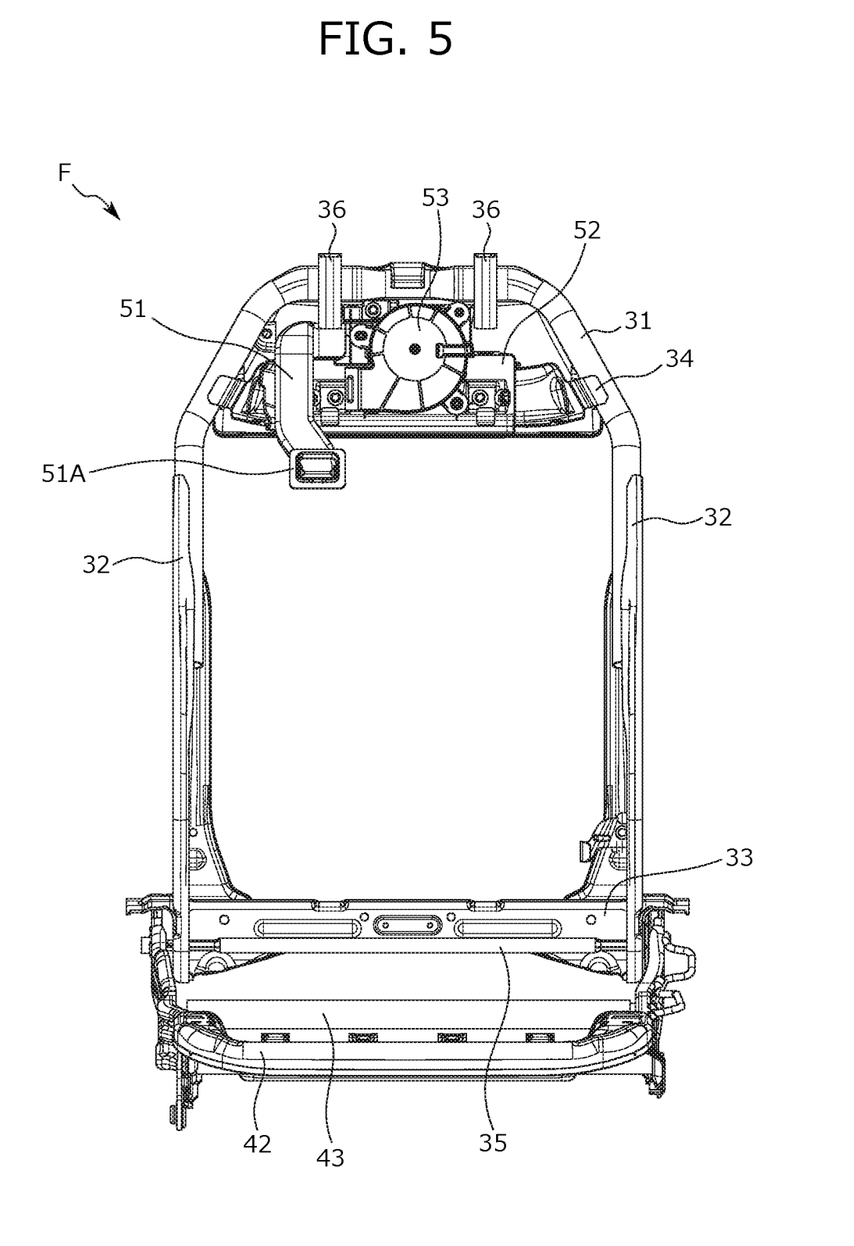
FIG. 5 is a front view of the seat frame.

FIG. 3 is a perspective view of a seat frame F forming a skeleton of the vehicle seat S and FIG. 4 is an exploded perspective view of the seat frame F. Further, FIG. 5 is a front view of the seat frame F.

Figure 6:
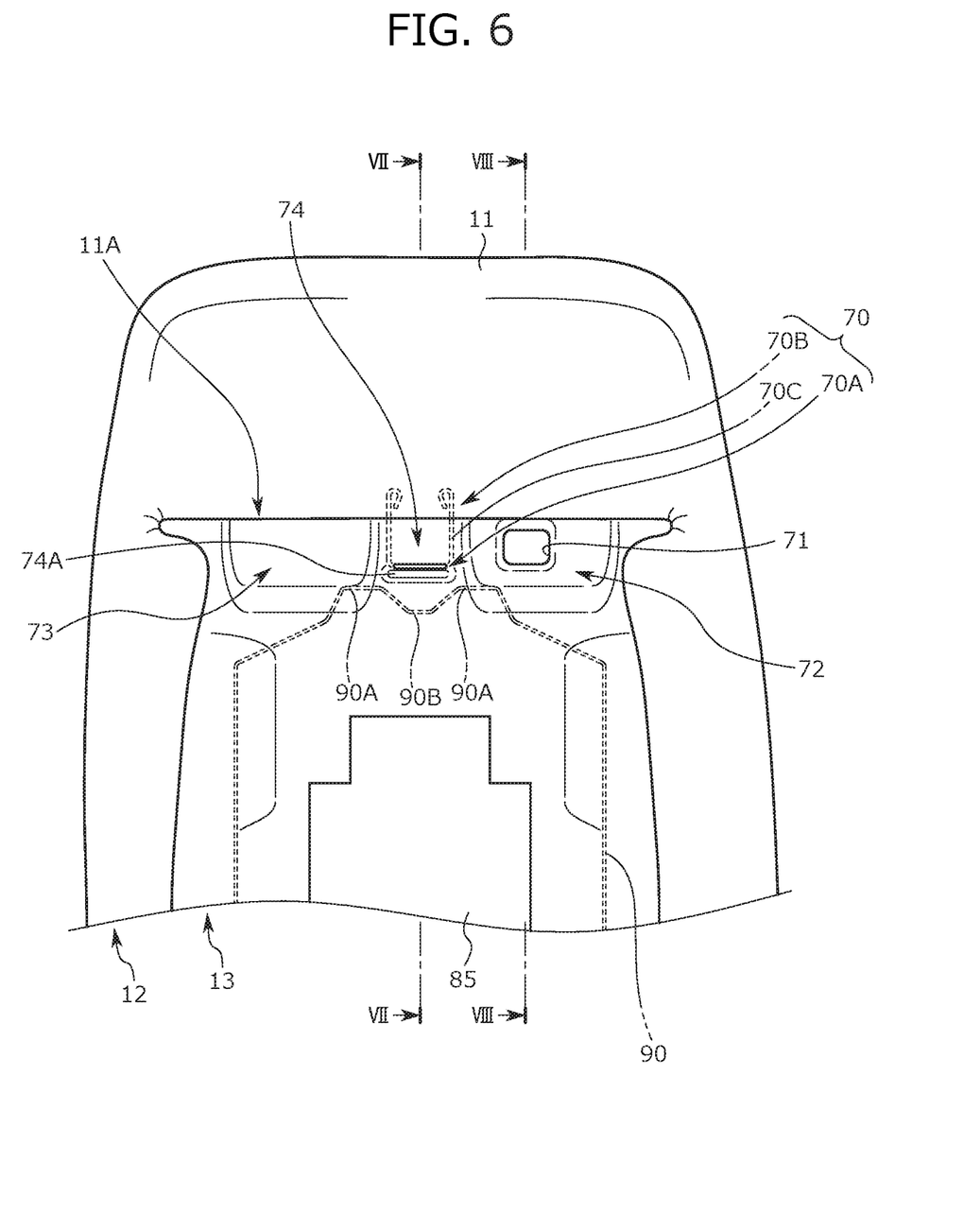
FIG. 6 is a rear view of a seat back in a state in which a skin material is separated.
Figure 7:
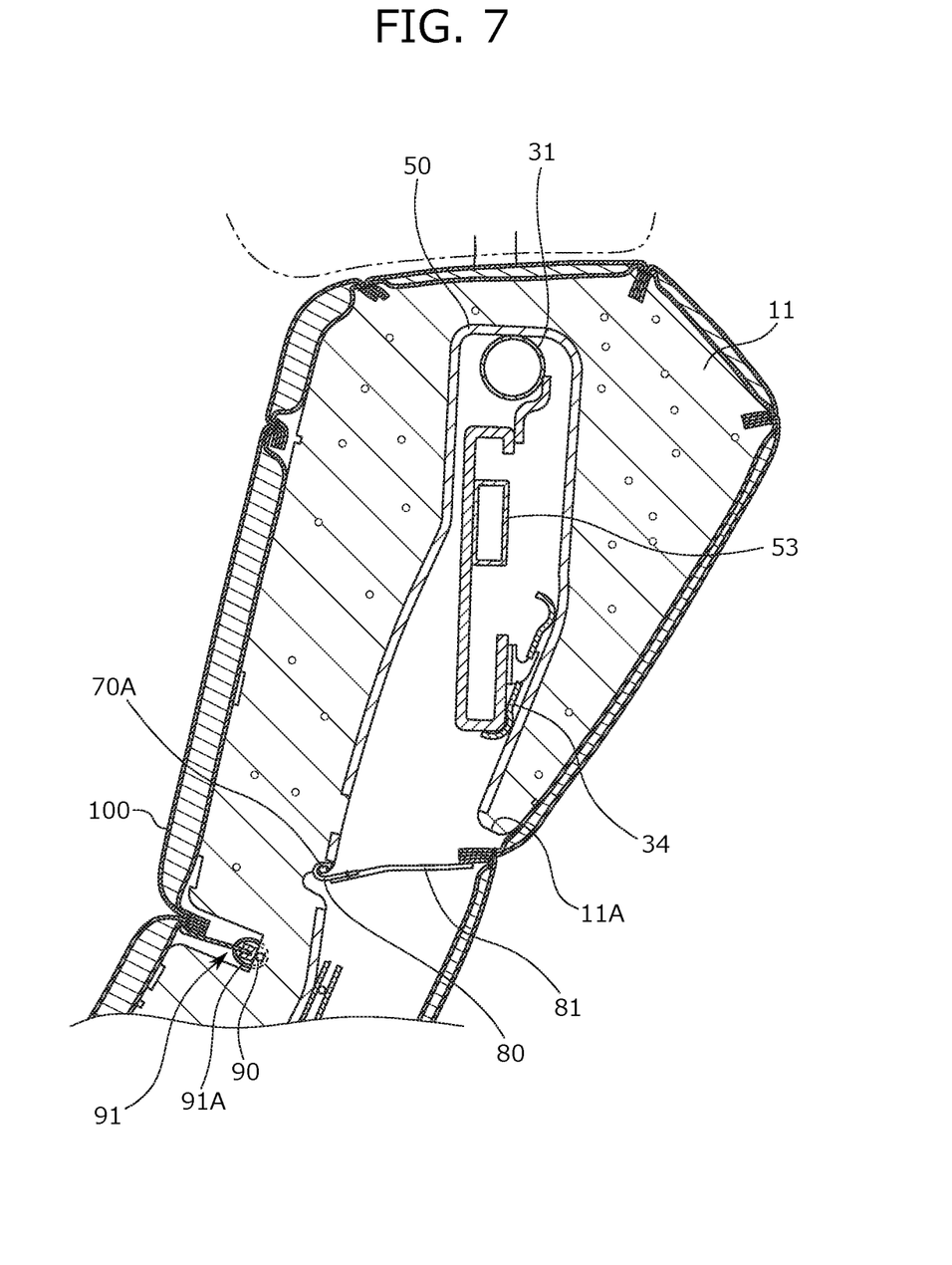
FIG. 7 is a cross-sectional view taken along a line VII-VII of the vehicle seat.
Figure 8:
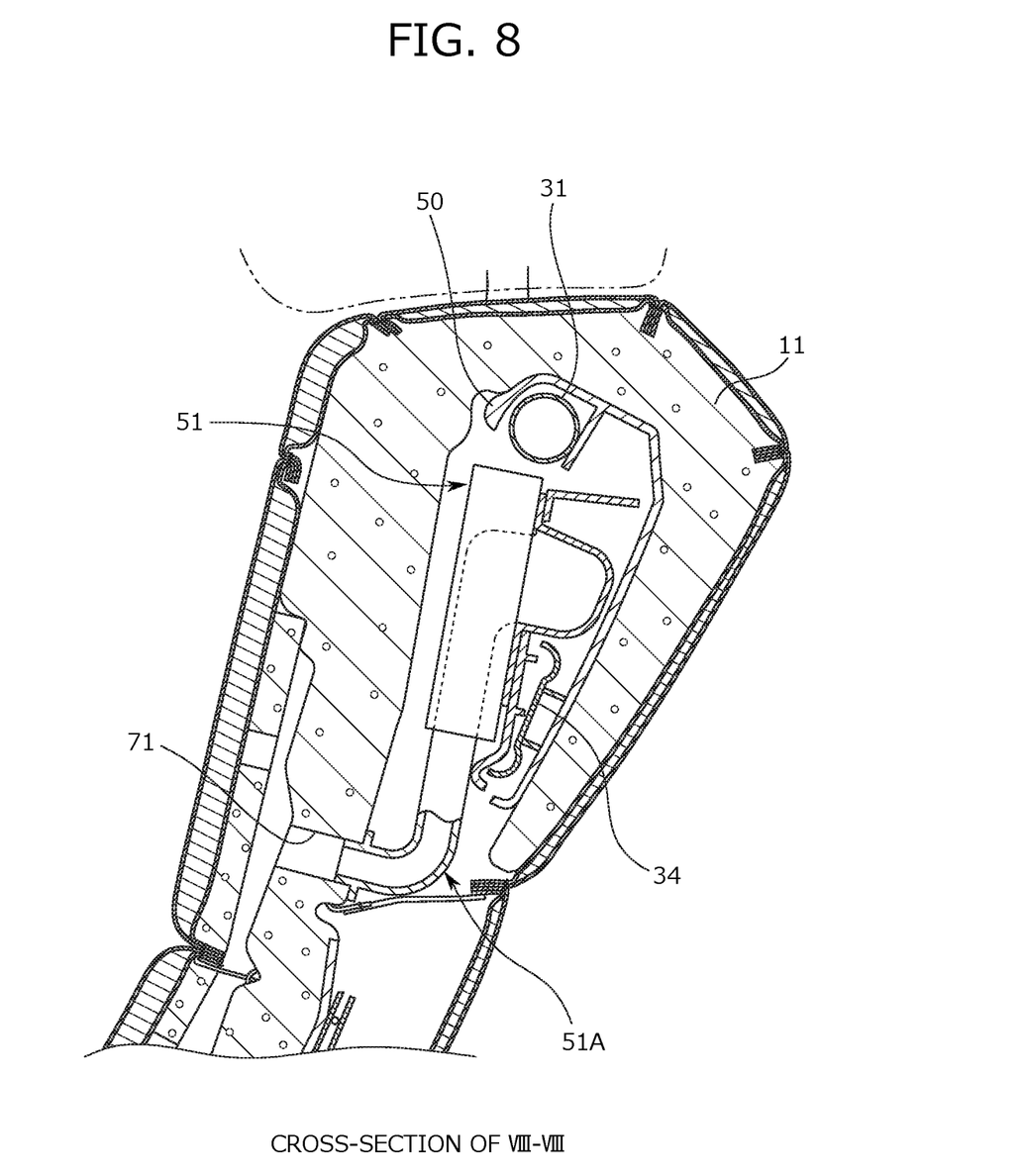
FIG. 8 is a cross-sectional view taken along a line VIII-VIII of the vehicle seat.

FIG. 6 is a rear view of a seat back S1 in a state in which a skin material 100 is separated. FIG. 7 is a cross-sectional view of the vehicle seat S when taken along a line VII-VII of FIG. 6 and FIG. 8 is a cross-sectional view of the vehicle seat S when taken along a line VIII-VIII of FIG. 6.

Figure 9:
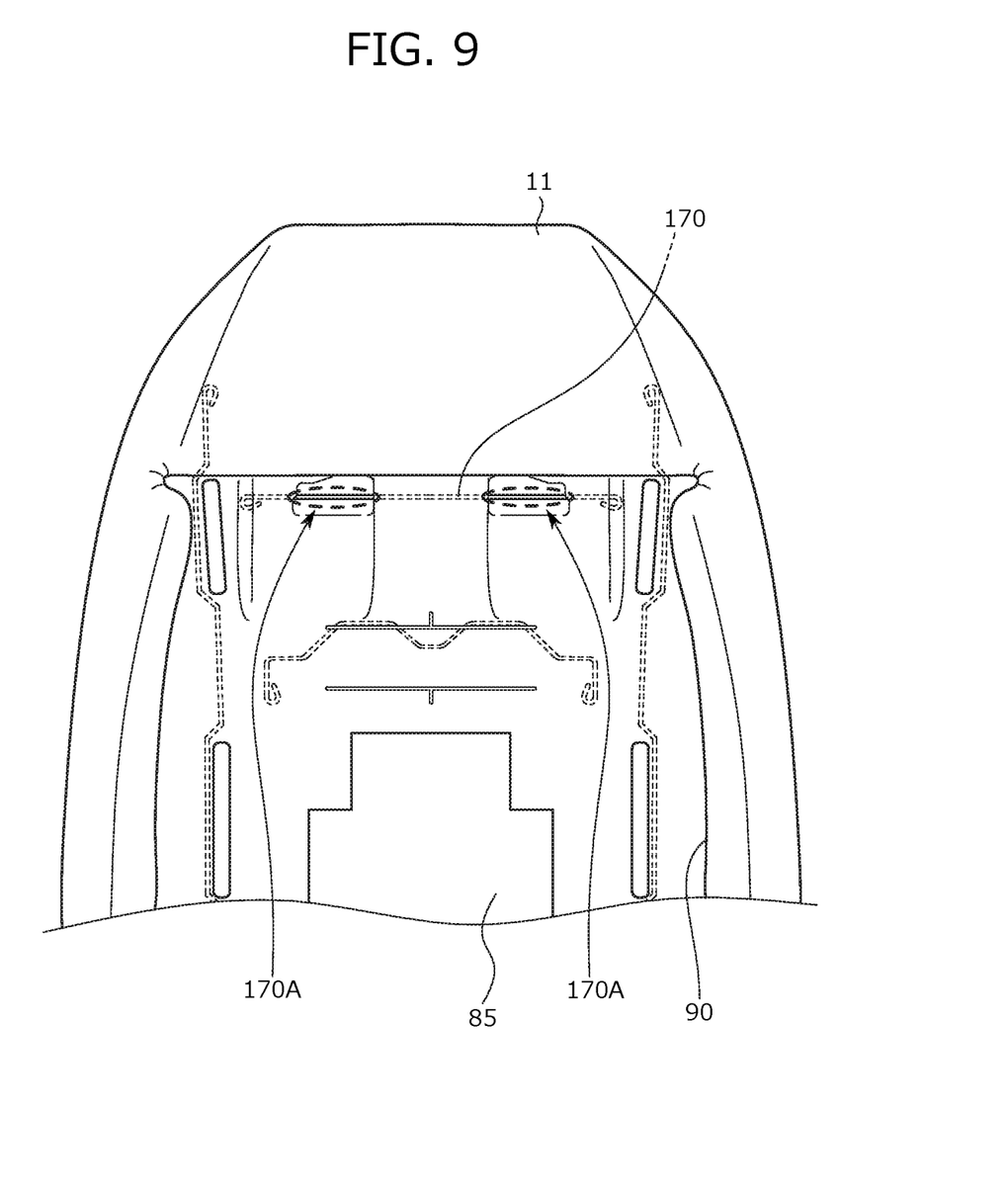
FIG. 9 is a diagram illustrating a modified example of a wire.

FIG. 9 is a rear view of the seat back S1 in a state in which the skin material is separated in a modified example of the vehicle seat S according to the present embodiment.

The vehicle seat S according to the present embodiment is a vehicle seat including a seat back (a seat back S1) forming a backrest surface, including: a seat back pad (a seat back pad 10) which is a cushion material of the seat back; a skin material (a skin material 100) which covers the seat back pad; a first engagement portion (a wire 70) of which a part is embedded inside the seat back pad and the other part is exposed to the seat rear surface; and a second engagement portion (a hook 80) which is attached to an end portion on the side of the seat rear surface in the skin material, wherein the first engagement portion engages with the second engagement portion so that the skin material is suspended and fixed to the seat rear surface of the seat back.

Additionally, in the following description, the "front to back direction" means the front to back direction when viewed from a person sitting on the vehicle seat S and is a direction aligned to the vehicle traveling direction. The "seat width direction" means the horizontal width direction of the vehicle seat S and is aligned to the right and left direction when viewed from the person sitting on the vehicle seat S. Further, in the following description, the "left side" indicates the left side when viewed from the seated person and similarly the "right side" indicates the right side when viewed from the seated person. Further, the "height direction" means the height direction of the vehicle seat S and is aligned to the up and down direction when the vehicle seat S is viewed from the front side.

First, a basic configuration of the vehicle seat S according to the present embodiment is described with reference to FIG. 1. As illustrated in FIG. 1, the vehicle seat S includes a seat back S1, a seat cushion S2, and a headrest S3.

The seat back S1 forms a backrest surface which supports a back and a waist of the person sitting on the vehicle seat S. The seat back S1 includes a seat back pad 10 which is a cushion material and a skin material 100 which covers the seat back pad 10 in its inside. Further, a groove 14 is formed in the seat back S1 and the skin material 100 is suspended and fixed to the groove 14. Additionally, a detail of a structure for suspending the skin material 100 is described below.

The seat cushion S2 forms a seating surface that supports buttocks and thighs of an occupant in the vehicle seat S. The seat cushion S2 includes the seat cushion pad 20 which is a cushion material and a skin material 200 which covers the seat cushion pad 20 in its inside. Further, a groove is also formed in the seat cushion S2 similarly to the seat back S1 and the skin material 200 is suspended and fixed to the groove.

The headrest S3 forms a head support surface that supports a head of an occupant in the vehicle seat S. Although not illustrated in FIG. 1, a pad which is a cushion material is covered with the skin material in the headrest S3.

Hereinafter, a detail of a configuration of the seat back pad 10 is described with reference to FIG. 2. The seat back pad 10 is formed of an elastic foam such as a urethane foam and gives a cushioning property to the vehicle seat S.

As illustrated in FIG. 2, the seat back pad 10 includes an upper seat back pad 11 (an example of a seat upper portion), a side seat back pad 12, and a lower seat back pad 13 (an example of a seat lower portion). Here, a groove 14 is formed among the upper seat back pad 11, the side seat back pad 12, and the lower seat back pad 13.

The upper seat back pad 11 is a cushion portion which supports an upper portion of an upper body of a person sitting on the vehicle seat S. The side seat back pad 12 is a cushion portion which supports a side portion of the upper body of the person sitting on the vehicle seat S. The lower seat back pad 13 is a cushion portion which supports a lower portion of the upper body of the person sitting on the vehicle seat S.

Here, the upper seat back pad 11 and the lower seat back pad 13 may be formed to have different hardness and density. Specifically, the upper seat back pad 11 may be formed of a material (urethane foam) having hardness and density lower than those of the lower seat back pad 13. With such a configuration, since the upper portion of the upper body of the seated person supported by the upper seat back pad 11 largely sinks into the vehicle seat S in relation to the lower portion of the upper body, it is possible to improve a shock absorbing property to a neck portion of the seated person, for example, in the event of a rear end collision.

Further, a headrest pillar insertion hole 15 is formed in the upper portion of the upper seat back pad 11. A headrest holder 36 to be described below is disposed inside the headrest pillar insertion hole 15 and a pillar of the headrest S3 is inserted through the headrest holder 36 so that the headrest S3 is attached to the seat back S1.

Hereinafter, a configuration of the seat frame F forming the skeleton of the vehicle seat S is described with reference to FIGS. 3 to 5. Additionally, the seat frame F illustrated in FIG. 3 corresponds to a state in which the seat back pad 10 and the seat cushion pad 20 illustrated in FIG. 2 are separated.

As illustrated in FIGS. 3 to 5, the seat frame F includes a seat back frame 30 which is the skeleton of the seat back S1 and a seat cushion frame 40 which is the skeleton of the seat cushion S2. The seat back frame 30 and the seat cushion frame 40 are rotatably connected to each other by a reclining shaft 35 and an angle between the seat back S1 and the seat cushion S2 is adjustable by a reclining mechanism.

The seat back frame 30 includes an inverse U-shaped upper frame 31, a pair of right and left side frames 32 which forms both ends in the seat width direction, and a lower frame 33 which is installed between the lower ends of the side frames 32. Further, a cross member frame 34 for installing the upper frame 31 is attached to the upper frame 31 by welding or the like.

Then, a seat back ventilation system 50 (an example of a ventilation unit) is attached to the cross member frame 34. The seat back ventilation system 50 has a ventilation function for ventilating inside of the seat back S1. Hereinafter, a configuration of the seat back ventilation system 50 is described with reference to FIG. 4.

As illustrated in FIG. 4, the seat back ventilation system 50 has a configuration in which a duct 51, a bracket 52, a blower 53 (an example of an air blowing portion), and a cover 55 are attached to the cross member frame 34 by using an attachment component 54 such as a bolt and a nut. The duct 51 includes a ventilation port 51A (an example of a duct hole) sending air to the blower 53 and air sucked from the ventilation port 51A passes through the blower 53 to be sent into the seat back S1. Accordingly, the ventilation of the seat back S1 is realized. Further, in the above-described example, an example in which the ventilation port 51A is an air suction port has been described, but the ventilation port 51A may be an air discharge port. In this case, air inside the seat back S1 is sucked into the blower 53 and is sent toward the seat front surface of the seat back S1 through the ventilation port 51A of the duct 51. In this case, wind blows to hit the back of the seated person.

The blower 53 is disposed to be located between the upper frame 31 and the cross member frame 34. Further, the ventilation port 51A of the duct 51 is disposed to be located below the cross member frame 34.

The seat cushion frame 40 has a rectangular frame-shaped outer shape when viewed from above and includes a pair of right and left cushion side frames 41 which is located at both end portions in the seat width direction, a pan frame 42 which forms a front end portion of the seat cushion frame 40, and a connection pipe 43 which forms a rear end portion of the seat cushion frame 40 and connects the cushion side frames 41 as main components.

A seat cushion ventilation system 60 is attached to the pan frame 42. The seat cushion ventilation system 60 has a ventilation function for ventilating inside of the seat cushion S2. Hereinafter, a configuration of the seat cushion ventilation system 60 is described with reference to FIG. 4.

As illustrated in FIG. 4, the seat cushion ventilation system 60 has a configuration in which a bracket 61 and a blower 62 are attached to the pan frame 42 by using an attachment component 63 such as a bolt and a nut. A ventilation port of the blower 62 faces the seated surface of the seat cushion S2 and air sucked from the seated surface of the seat cushion S2 to the blower 62 is sent into the seat cushion S2. Accordingly, the ventilation of the seat cushion S2 is realized. Further, in the above-described example, an example in which the blower 62 sucks air of the seat surface of the seat cushion S2 has been described, but the blower 62 may discharge air to the seated surface of the seat cushion S2. In this case, wind blows to hit the seated portion of the person sitting on the seat cushion S2.

Next, a structure in which the skin material 100 is suspended on the seat back S1 is described with reference to FIGS. 6 to 8.

FIG. 6 is a rear view of the upper seat back pad 11, the side seat back pad 12, and the lower seat back pad 13. Further, as illustrated in FIG. 6, at the lower portion of the rear surface lower end portion 11A of the front surface portion (the seat front surface side pad portion) of the upper seat back pad 11, a convex portion 74 is provided at the center portion in the seat width direction, a concave portion 72 is provided at the right side of the convex portion 74, and a concave portion 73 is provided at the left side thereof. Then, the concave portion 72 has a duct hole 71 and the duct 51 of the seat back ventilation system 50 passes through the duct hole 71.

Further, the convex portion 74 has a dent portion 74A and the wire 70 (an example of the first engagement portion) is provided at the upper portion of the dent portion 74A. Additionally, an embedded portion 70B which is a part of the wire 70 is embedded in the front surface portion of the upper seat back pad 11 and an exposure portion 70A is exposed to the seat rear surface. In addition, the exposure portion 70A includes an extension portion which extends in the seat width direction.

Further, as illustrated in FIG. 7, the hook 80 (an example of a hook-shaped portion of the second engagement portion) which is attached through a hook attachment portion 81 provided at an end portion of the skin material 100 on the side of the seat rear surface engages with the exposure portion 70A of the wire 70. Accordingly, the skin material 100 can be suspended on the rear surface of the seat back S1.

Further, as illustrated in FIG. 7, the blower 53 is disposed in an inner space of the upper seat back pad 11 and the blower 53 is located above the engagement position between the exposure portion 70A of the wire 70 and the hook 80. Since the inner space above the skin suspension position of the rear surface decreases in size due to the skin suspension mechanism, the air blowing sound generated by the blower 53 hardly leaks to the outside of the seat when the blower 53 is disposed in the inner space.

Further, as illustrated in FIG. 8, the duct 51 is disposed in the inner space of the upper seat back pad 11 and the ventilation port 51A of the duct 51 is fitted to the duct hole 71. Here, as illustrated in FIGS. 6 and 8, at least a part of the duct 51 is located above the engagement position between the exposure portion 70A of the wire 70 and the hook 80. As described above, since the inner space above the skin suspension position of the rear surface decreases in size due to the skin suspension mechanism, it is possible to restrict the movement of the duct 51 by disposing at least a part of the duct 51 in the inner space. Accordingly, it is possible to suppress the generation of noise and abnormal sound due to the rattling of the connection portion between the duct 51 and the other member (for example, the blower 53).

Further, as illustrated in FIG. 6, a press felt 85 adheres to the center portion of the rear surface lower end portion 11A to reinforce the strength of the center portion.

Further, the wire 90 (an example of the third engagement portion) is embedded in the seat back pad 10 along the groove 14. As illustrated in FIG. 7, since the wire engagement portion 91 (an example of the fourth engagement portion) provided at an end portion of the skin material 100 on the side of the seat front surface engages with the wire 90 by using a C-ring 91A, the skin material 100 can be suspended on the front surface of the seat back S1.

Further, as illustrated in FIG. 8, the wire 70 (the exposure portion 70A) for suspending the rear surface side skin material 100 is located at a position facing the wire 90 for suspending the front surface side skin material 100 in the front to back direction of the seat and is located thereabove in the up and down direction of the seat. Then, the exposure portion 70A of the wire 70 and the portion engaging with the wire engagement portion 91 of the wire 90 have parallel portions at the upper and lower positions of the seat. That is, the suspending portion of the front surface side skin material 100 and the suspending portion of the rear surface side skin material 100 have parallel portions at the upper and lower positions of the seat.

By disposing the suspending portion of the front surface side skin material 100 and the suspending portion of the rear surface side skin material 100 in this way, since a force is applied to the upper seat back pad 11 with a good balance, the assembling workability can be improved. Accordingly, since the skin material 100 of the vehicle seat S can be suspended without wrinkles, the appearance design of the vehicle seat S can be improved.

In this way, in the vehicle seat S according to the present embodiment, when the wire 70 embedded in the seat back pad 10 engages with the hook 80 attached to the end portion of the skin material 100 on the side of the seat rear surface, the skin material 100 can be suspended and fixed to the seat rear surface of the seat back S1.

Accordingly, it is possible to suspend the skin material without wrinkles even at a position in which the unevenness of the seat rear surface is large and steps are likely to be formed. That is, according to the vehicle seat S, it is possible to realize a satisfactory appearance design also on the seat rear surface. Further, since it is possible to suppress the seat rear surface from being widened when the vehicle seat S is applied to the front seat, it is possible to widen the clearance with the rear seat. Further, since the wire 70 for suspending the skin material 100 is embedded and fixed to the seat back pad 10, there is no need to weld a mechanism such as a bracket or a wire for suspending the skin material 100 to the seat frame F. For that reason, it is possible to decrease the weight of the seat and to reduce the number of working steps necessary for suspending the skin material. Further, in the vehicle seat S, since the mechanism for suspending the skin material 100 is provided at the seat back pad 10 instead of the seat frame F, an operation in which the occupant sinks into the seat in the event of a rear end collision is not hindered. Accordingly, it is possible to improve a shock absorbing performance for the neck portion of the occupant.

Further, in the vehicle seat S, it is possible to dispose the mechanism for suspending the skin material 100 while avoiding the duct 51 of the seat back ventilation system 50. Accordingly, since there is no interference between the seat back ventilation system 50 and the mechanism for suspending the skin material 100, it is possible to decrease the size of the vehicle seat S even when the seat back ventilation system 50 is provided. That is, it is possible to suspend the skin material 100 covering the seat back pad 10 without wrinkles even when the seat back ventilation system 50 is assembled to the upper portion of the seat back frame 30.

Further, in the vehicle seat S, since the skin material 100 is suspended at one end near the rear surface lower end portion 11A of the upper seat back pad 11, it is possible to decrease the number of the suspending steps compared to a case in which a plurality of suspending positions exist. Further, since the number of suspending positions is set to be minimal, it is possible to suppress the interference between the suspending mechanism and the other mechanisms. That is, it is possible to improve the degree of freedom in arrangement inside the vehicle seat S.

Further, in the vehicle seat S, the blower 53 of the seat back ventilation system 50 is disposed at a position above the engagement position between the wire 70 and the hook 80 and a position between the front and rear surfaces of the seat back pad 10 (the upper seat back pad 11). Accordingly, since the vicinity of the blower 53 inside the seat is covered by the seat back pad 10 and the suspending inner space is narrowed by the skin material 100, it is possible to suppress the leakage of the sound of the blower 53 to the outside.

Further, in the vehicle seat S, the wire 90 embedded in the groove 14 of the seat back pad 10 engages with the wire engagement portion 91 attached to the end portion on the side of the seat front surface in the skin material 100 and the skin material is drawn into the groove 14 to be suspended and fixed to the seat front surface. Accordingly, it is possible to suppress the forward/backward movement of the seat back pad 10 by eliminating a gap between the seat back pad 10 and the seat frame F. Further, since the skin material 100 of the seat back S1 can be suspended and fixed to both of the front and rear surfaces of the seat, a satisfactory appearance design can be obtained.

Further, the present disclosure is not limited to the above-described embodiment. For example, when the seat back ventilation system 50 is not provided in the seat back S1, a part of the wire 170 which is longer than the wire 70 in the seat width direction may be embedded in the upper seat back pad 11 and the plurality of hooks 80 provided at the end portion of the skin material 100 may engage with the engagement regions 170A provided at a plurality of positions of the wire 170 as illustrated in FIG. 9.

TABLE OF REFERENCE NUMERALS

S: vehicle seat
  S1: seat back
  S2: seat cushion
  S3: headrest
F: seat frame
10: seat back pad
  11: upper seat back pad (seat upper portion)
    11A: rear surface lower end portion
  12: side seat back pad
  13: lower seat back pad (seat lower portion)
  14: groove
  15: headrest pillar insertion hole
20: seat cushion pad
30: seat back frame
  31: upper frame
  32: side frame
  33: lower frame
  34: cross member frame
  35: reclining shaft
  36: headrest holder
40: seat cushion frame
  41: cushion side frame
  42: pan frame
  43: connection pipe
50: seat back ventilation system (ventilation unit)
  51: duct
    51A: ventilation port (duct hole)
  52: bracket
  53: blower (air blowing portion)
  54: attachment component
55: cover
60: seat cushion ventilation system
  61: bracket
  62: blower
  63: attachment component
70: wire (first engagement portion)
  70A: exposure portion
  70B: embedded portion
  70C: downward convex portion, convex portion of first engagement portion
71: duct hole
72: concave portion of seat back pad
73: concave portion of seat back pad
74: convex portion of seat back pad
  74A: dent portion
80: hook (second engagement portion, hook-shaped portion)
81: hook attachment portion
85: press felt
90: wire (third engagement portion)
  90A: upward convex portion, convex portion of third engagement portion
  90B: concave portion of third engagement portion
91: wire engagement portion (fourth engagement portion)
  91A: C-ring
100: skin material
170: wire
  170A: engagement region
200: skin material

The invention claimed is:

1. A vehicle seat, comprising:
a seat back that forms a backrest surface;
a seat back pad that is a cushion material of the seat back;
a skin material that covers the seat back pad;
a first engagement portion, wherein a part of the first engagement portion is embedded inside the seat back pad and another part of the first engagement portion is exposed to a seat rear surface of the seat back;
a second engagement portion that is attached to an end portion of the skin material on a side of the seat rear surface of the seat back;
a third engagement portion that is embedded in the seat back pad and is provided in the vicinity of a groove formed on a seat front surface of the seat back; and
a fourth engagement portion that is attached to an end portion of the skin material on a side of the seat front surface of the seat back;
wherein the first engagement portion engages with the second engagement portion so that the skin material is suspended and fixed to the seat rear surface of the seat back,
wherein the third engagement portion engages with the fourth engagement portion so that the skin material is suspended and fixed to the seat front surface of the seat back,
wherein the first engagement portion and the third engagement portion are respectively a wire for suspending the rear surface side skin material and a wire for suspending the front surface side skin material and are separate members from each other,
wherein the wire for suspending the rear surface side skin material is located above the wire for suspending the front surface side skin material,
wherein the first engagement portion includes a downward convex portion that is convex downward, and the third engagement portion includes an upward convex portion that is convex upward, and wherein the first engagement portion and the third engagement portion are arranged so that the downward convex portion and the upward convex portion face each other.

2. The vehicle seat according to claim 1, wherein the first engagement portion has a U-shape with an upper side being opened.

3. The vehicle seat according to claim 1, wherein the third engagement portion has a plurality of convex portions that include the upward convex portion.

4. The vehicle seat according to claim 1, wherein the seat back pad includes a convex portion that is provided at a center portion of the seat back pad in a seat width direction and the first engagement portion is provided at the convex portion of the seat back pad.

5. The vehicle seat according to claim 4, wherein the convex portion of the seat back pad is bulged rearward.

6. The vehicle seat according to claim 4, wherein the third engagement portion is arranged inside the convex portion of the seat back pad.

7. A vehicle seat, comprising:
a seat back that forms a backrest surface;
a seat back pad that is a cushion material of the seat back;
a skin material that covers the seat back pad;
a first engagement portion, wherein a part of the first engagement portion is embedded inside the seat back pad and another part of the first engagement portion is exposed to a seat rear surface of the seat back;
a second engagement portion that is attached to an end portion of the skin material on a side of the seat rear surface of the seat back;
a third engagement portion that is embedded in the seat back pad and is provided in the vicinity of a groove formed on a seat front surface of the seat back; and
a fourth engagement portion that is attached to an end portion of the skin material on a side of the seat front surface of the seat back;
wherein the first engagement portion engages with the second engagement portion so that the skin material is suspended and fixed to the seat rear surface of the seat back,
wherein the third engagement portion engages with the fourth engagement portion so that the skin material is suspended and fixed to the seat front surface of the seat back,
wherein the first engagement portion and the third engagement portion are respectively a wire for suspending the rear surface side skin material and a wire for suspending the front surface side skin material and are separate members from each other,
wherein the wire for suspending the rear surface side skin material is located above the wire for suspending the front surface side skin material,
wherein a length of the third engagement portion in a seat width direction is greater than a length of the first engagement portion in the seat width direction, and
wherein the seat back pad includes a convex portion that is provided at a center portion of the seat back pad in the seat width direction and the first engagement portion is provided at the convex portion of the seat back pad.

8. The vehicle seat according to claim 7, wherein the first engagement portion has a U-shape with an upper side being opened.

9. The vehicle seat according to claim 7, wherein the third engagement portion has a plurality of convex portions.

10. The vehicle seat according to claim 7, wherein the convex portion of the seat back pad is bulged rearward.

11. The vehicle seat according to claim 7, wherein the third engagement portion is arranged inside the convex portion of the seat back pad.

12. A vehicle seat, comprising:
a seat back that forms a backrest surface;
a seat back pad that is a cushion material of the seat back;
a skin material that covers the seat back pad;
a first engagement portion, wherein a part of the first engagement portion is embedded inside the seat back pad and another part of the first engagement portion is exposed to a seat rear surface of the seat back;
a second engagement portion that is attached to an end portion of the skin material on a side of the seat rear surface of the seat back;
a third engagement portion that is embedded in the seat back pad and is provided in the vicinity of a groove formed on a seat front surface of the seat back; and
a fourth engagement portion that is attached to an end portion of the skin material on a side of the seat front surface of the seat back;
wherein the first engagement portion engages with the second engagement portion so that the skin material is suspended and fixed to the seat rear surface of the seat back,
wherein the third engagement portion engages with the fourth engagement portion so that the skin material is suspended and fixed to the seat front surface of the seat back,
wherein the first engagement portion and the third engagement portion are respectively a wire for suspending the rear surface side skin material and a wire for suspending the front surface side skin material and are separate members from each other,
wherein the wire for suspending the rear surface side skin material is located above the wire for suspending the front surface side skin material,
wherein the first engagement portion includes a convex portion and the third engagement portion includes a concave portion, and
wherein the convex portion of the first engagement portion and the concave portion of the third engagement portion are arranged to face each other and to overlap each other in an up-to-down direction.

13. The vehicle seat according to claim 12, wherein the first engagement portion has a U-shape with an upper side being opened.

14. The vehicle seat according to claim 12, wherein the third engagement portion has a plurality of convex portions.

15. The vehicle seat according to claim 12, wherein the seat back pad includes a convex portion that is provided at a center portion of the seat back pad in a seat width direction and the first engagement portion is provided at the convex portion of the seat back pad.

16. The vehicle seat according to claim 15, wherein the convex portion of the seat back pad is bulged rearward.

17. The vehicle seat according to claim 15, wherein the third engagement portion is arranged inside the convex portion of the seat back pad.

* * * * *